United States Patent
Won et al.

(10) Patent No.: US 10,290,139 B2
(45) Date of Patent: May 14, 2019

(54) METHOD FOR EXPRESSING SOCIAL PRESENCE OF VIRTUAL AVATAR, USING CHANGE IN PUPIL SIZE ACCORDING TO HEARTBEATS, AND SYSTEM EMPLOYING SAME

(71) Applicant: SANGMYUNG UNIVERSITY INDUSTRY-ACADEMY COOPERATION FOUNDATION, Seoul (KR)

(72) Inventors: Myoung Ju Won, Cheonan-si (KR); Min Cheol Whang, Goyang-si (KR); Sang In Park, Seoul (KR)

(73) Assignee: SANGMYUNG UNIVERSITY INDUSTRY-ACADEMY COOPERATION FOUNDATION (KR)

( * ) Notice: Subject to any disclaimer, the term of this patent is extended or adjusted under 35 U.S.C. 154(b) by 0 days.

(21) Appl. No.: 15/566,261

(22) PCT Filed: Feb. 1, 2016

(86) PCT No.: PCT/KR2016/001054
§ 371 (c)(1),
(2) Date: Oct. 13, 2017

(87) PCT Pub. No.: WO2016/167459
PCT Pub. Date: Oct. 20, 2016

(65) Prior Publication Data
US 2018/0122123 A1    May 3, 2018

(30) Foreign Application Priority Data
Apr. 15, 2015 (KR) .................. 10-2015-0053145

(51) Int. Cl.
*G06F 3/01* (2006.01)
*G06T 13/40* (2011.01)

(52) U.S. Cl.
CPC .............. *G06T 13/40* (2013.01); *G06F 3/013* (2013.01); *G06F 3/015* (2013.01)

(58) Field of Classification Search
CPC .......... G06T 13/40; G06F 3/013; G06F 3/015
See application file for complete search history.

(56) References Cited

U.S. PATENT DOCUMENTS

2009/0044113 A1* 2/2009 Jones ................. G06T 13/40
                                                                      715/707
2011/0077546 A1    3/2011 Fabian
(Continued)

FOREIGN PATENT DOCUMENTS

EP    2842491    3/2015
KR    20140004639    1/2014

OTHER PUBLICATIONS

International Search Report, International Application No. PCT/KR2016/001054, dated May 23, 2016.
(Continued)

*Primary Examiner* — Kee M Tung
*Assistant Examiner* — Grace Q Li
(74) *Attorney, Agent, or Firm* — Perman & Green, LLP (57) ABSTRACT

A method of producing a realistic virtual avatar by using a change in a pupil size according to heartbeats. The method tracks and records, in real time, a change in a pupil size of the actual user according to heartbeats of the actual user and applies the same to an eye model of a virtual avatar so as to synchronize the pupil size of the eye model with the pupil size of the actual user.

4 Claims, 6 Drawing Sheets

(56) References Cited

U.S. PATENT DOCUMENTS

| | | | |
|---|---|---|---|
| 2012/0083675 A1 | 4/2012 | el Kaliouby et al. | |
| 2012/0299824 A1* | 11/2012 | Hoshuyama | G06F 17/30569 345/156 |
| 2014/0100464 A1 | 4/2014 | Kaleal et al. | |
| 2014/0267342 A1 | 9/2014 | Liu | |
| 2015/0127265 A1 | 5/2015 | Iizuka | |
| 2015/0223743 A1* | 8/2015 | Pathangay | A61B 5/18 600/301 |
| 2016/0045741 A1* | 2/2016 | Libbus | A61N 1/36146 607/44 |
| 2016/0220163 A1* | 8/2016 | Yamada | G16H 20/70 |

OTHER PUBLICATIONS

Argyle, et al. "Eye-Contact, Distance and Affiliation". American Sociological Association, Journal of Sociometry, vol. 28, Issue 3, Sep. 1965, pp. 289-304.

Mehrabian, Albert. "Silent Messages". Wadsworth Publishing Company, Inc., California, 1971. ISBN:-0-534-00059-2.

Wilhelm, Helmut. "Neuro-Ophthalmology of Pupillary Function—Practical Guidelines". Springer-Verlag, Journal of Neurology, vol. 245, Issue 9, pp. 573-583.

Won, et al. "Realistic Expression Factors According to Visual Presence in Terms of Iris Color and Pupil Accommodation of Virtual Avatar" The Korean Contents Association, Journal of the Korean Contents Association, vol. 14, Issue 4, 2014, pp. 1-8. DOI : 10.5392/JKCA.2014.14.04.001.

Won, et al. "A Study on Evaluation of Visual Factor for Measuring Subjective Virtual Realization". Korean Journal of the Science of Emotion & Sensibility, vol. 15, Issue 3, Sep. 2012, pp. 389-398.

Gullstrand, et al. Einfuhrung in die Methoden der Dioptrik des Auges, Leipzig: Verlag von S. Hirzel, 1911.

Gonzalez, et al "Digital Image Processing". Second Edition, Prentice-Hall, Inc. New Jersey, 2002. ISBN: 0-201-18075-8.

Pan, et al. "A Real-Time QRS Detection Algorithm".IEEE Transations on Biomedical Engineering, vol. 32, Issue 3, Mar. 1985, pp. 230-236.

Cho, et al. "Robust Gaze-Tracking Method by Using Frontal Viewing and Eye-Tracking Cameras". Journal of Optical Engineering, vol. 48, Issue 12, Dec. 2009, pp. 1-15.

Doyle, W. "Operations Useful for Similarity-Invariant Pattern Recognition". The Rand Corporation, Journal of the ACM, vol. 9, Issue 2, Apr. 1962, pp. 259-267.

Park, et al. "Does Visual Fatigue from 3D Displays Affect Autonomic Regulation and Heart Rhythm?" Elsevier, International Journal of Psychophysiology, vol. 92, 2014, pp. 42-48.

Won, et al. "Development of Realistic Digital Expression of Human Avatars through Pupillary Responses based on Heart Rate", youtube.com, Uploaded Apr. 6, 2015.

* cited by examiner

METHOD FOR EXPRESSING SOCIAL PRESENCE OF VIRTUAL AVATAR, USING CHANGE IN PUPIL SIZE ACCORDING TO HEARTBEATS, AND SYSTEM EMPLOYING SAME

CROSS-REFERENCE TO RELATED APPLICATIONS

This application is the National Stage of International Application No. PCT/KR2016/001054, having an International Filing Date of 1 Feb. 2016, which designated the United States of America, and which International Application was published under PCT Article 21 (2) as WO Publication No. 2016/167459 A1, and which claims priority from and the benefit of Korean Application No. 10-2015-0053145, filed on 15 Apr. 2015, the disclosures of which are incorporated herein by reference in their entirety.

BACKGROUND

1. Field

The presently disclosed embodiment relates to a method of producing a human-avatar or virtual avatar having an incremented social engagement by using a change in a pupil size according to heartbeats.

2. Brief Description of Related Developments

Currently-developed avatar eye modeling technology has been only focused on realistically expressing an external appearance of an avatar from an actual anatomical point of view. Some modeling techniques apply expression of a change in the size of a pupil or fine trembling of the pupil in a specific situation of, for example, upsetting, frightening, or lying, but this application is limited.

As eyes are generally called "a window of heart", human expresses his or her intention and reveals his or her emotion, with his or her eyes. Eyes are used as a feedback signal for an interaction between two people, and affect a behavior of the other person (See Klopf, Donald W & Park, Myung-seok (1982). Cross-cultural communication: an introduction to the fundamentals. Han Shin, Seoul; Argyle, Michael (1969). Social Interaction, Atherton Press, New York; Argyle, Michael and Dean, Janet (1965). Eye Contact, Distance and Affiliation, American Sociological Association, Sociometry Journal; Mehrabian, Albert (1971). Silent Messages. Wadsworth Publishing Company, Inc. California; and Birdwhistell, Ray L. (1952). Introduction to Kinesics: (An Annotation System for Analysis of Body Motion and Gesture), University of Louisville, Mich.). Facial expressions, voices, and behaviors express intentions and reveal emotions, and intentionally express different contents from the facts or hide the facts. However, eyes cannot hide intentions and emotions. Human adjusts the focus when trying to see something, and continuously moves to focus on something. The frequency of such an eye movement is generally about 3 to 4 times per second. Eyes change according to the intensities of light or emotional states while continuously moving. Such a pupillary response is involuntary, and is thus naturally controlled and varies as the heart involuntarily runs fast when people are nervous. The pupillary response is useful to understand the psychological state or emotional state of human. In addition, the fact that pupils reflect activation of an autonomic nervous system is well known, and is in use during disease diagnosis in some areas (Wilhelm, Helmut (1998). Neuro-Ophthalmology of Pupillary Function-Practical Guidelines, Springer-Verlag, Journal of Neurology). The size of a pupil depends on contraction of a sphincter and a dilator which constitute an iris, and each muscle is adjusted under the control of an autonomic nervous system. For this reason, a preceding research has evaluated whether expression factors of an iris color and pupil accommodation affect a visual presence of a user, and has confirmed that the expression factors affected all of a visual presence, a visual immersion, and a visual interaction of a user (Won, Myoung Ju, Park, Sang In, Lee, Eui Chul, Whang, Min Cheol (2014). Realistic Expression Factors According to Visual Presence in Terms of Iris Color and Pupil Accommodation of Virtual Avatar, The Korean Contents Association, Journal of the Korean Contents Association). However, because the above research defines a pupillary response as a variation of arbitrary three states (normal, positive-negative, and arousal-relaxation) and randomly proposes the same, the above research has a limitation of failing to applying pupil accommodation of a user that changes in real time.

<Project Information 1>

Project unique number: 2015-0029756

Government department name: Ministry of Science, ICT and Future Planning

Research management professional institution: the Center of Human-centered Interaction for Coexistence Research business name: Source technology development business (global frontier research development business)

Research project name: Development of technology of Neuro-Emotion Intelligence Vision-based user emotion tracking and active emotion expression and feedback of human-avatar Managing institution: the Center of Human-centered Interaction for Coexistence Participating institution: Sanqmyung University Industry-Academia Collaboration Foundation Research period: 2015 Sep. 1-2016 Jun. 30

<Project Information 2>

Project unique number: 1711026696

Government department name: Ministry of Science, ICT and Future Planning

Research management professional institution: Institute for Information and Communication Technology Promotion Research business name: Development of technology for social life logging based on analyzing social emotion and intelligence of convergence contents Research project name: Development of technology for social life logging based on analyzing social emotion and intelligence of convergence contents Managing institution: Sangmyung University Industry-Academia Collaboration Foundation Participating institution: Emotion Science Research Center Research period: Mar. 1, 2015 to Feb. 29, 2016.

SUMMARY

The presently disclosed embodiment provides a method of producing a virtual avatar having an incremented social engagement by using a change in a pupil size according to heartbeats.

According to an aspect of the presently disclosed embodiment, there is provided a method of expressing a social engagement of a virtual avatar, the method including synchronizing a change in a size of a pupil of a virtual avatar correlated with a user according to a change in heartbeats of the user obtained from physiological information obtained from the user.

According to an aspect of the presently disclosed embodiment, the change in the heartbeats may be detected from electrocardiogram (ECG) data obtained from the user.

According to another aspect of the presently disclosed embodiment, a change in a pupil size of the user may be inferred from the ECG data via a regression analysis, and the size of the pupil of the virtual avatar may be synchronized with the extracted change in the pupil size of the user.

According to an aspect of the presently disclosed embodiment, R-peak to R-peak intervals (RRIs) may be detected from the ECG data, and the change in the pupil size of the user may be detected via a regression analysis of the RRIs.

According to an aspect of the presently disclosed embodiment, the pupil size of the user may be calculated using an equation below:

Pupil size=76.148+(−42.494)×RRI.

According to another aspect of the presently disclosed embodiment, there is provided a system for expressing a social engagement of a virtual avatar, the system including a detecting system configured to extract physiological information from a user; an analysis system configured to detect a change in a pupil size of the user from the physiological information; and a display system configured to display a virtual avatar correlated with the user and having an eye model that changes in correspondence with the change in the pupil size of the user detected by the analysis system.

According to the presently disclosed embodiment, high presence and high immersion may be provided by applying a change in a pupil size of an actual user according to heartbeats of the actual user to a virtual avatar in real time. In a method proposed according to the presently disclosed embodiment, a three-dimensional (3D) model engineer may be utilized as a new expression factor that is applicable during a character design. In particular, in virtual environments, a factor, such as a facial expression or eyes of a virtual avatar, affects a direct presence of a user. However, the virtual avatar is modeled by being focused on only a visual shape or a movement of a muscle. Therefore, according to the presently disclosed embodiment, a factor corresponding to a change in a pupil according to a user's internal response in addition to an external factor, such as the face of a virtual avatar, is an important factor for effectively expressing the virtual avatar, and is greatly used for a basic research for designing an avatar in a virtual environment.

DETAILED DESCRIPTION

Hereinafter, a substance expressing method according to the presently disclosed embodiment will be described in detail by explaining exemplary aspects with reference to the attached drawings.

The presently disclosed embodiment has determined a correlation between an R-peak to R-peak interval (RRI) and a pupillary response by using an electrocardiogram (ECG), which is an autonomic nervous system measuring method, and has derived a regression model capable of inferring a pupillary response depending on activity of an autonomic nervous system. A pupillary response according to an emotional state of a user has been inferred based on the derived regression model and applied to a virtual-avatar system. Herein, a virtual avatar may be expressed as a human. According to another aspect, an animal or a virtual living thing, for example, an alien or a personified object, may be expressed as an avatar.

In other words, the presently disclosed embodiment proposes a method of reflecting an emotional state of an actual user and improving a realistic interaction and a realistic immersion by applying, in real time, an expression factor of a change in a pupil size of the actual user according to a change in heartbeats of the actual user to a virtual avatar implemented in various types.

1. Participants

The participants of the present research were 64 people of university students and ordinary people (32 women, an average age of 23.03±2.16) having a normal visual function and a naked vision of 0.8 or greater. After the participants were made sufficiently recognize an experiment procedure, they were selected as people who voluntarily agreed to participate in the experiment. The participants were recommended to take a sufficient rest before the experiment in order to minimize an influence of a decrease in a pupil size according to activation of a parasympathetic nerve due to sleepiness and fatigue of the participants. In addition, the participants were requested to refrain from exercise, smoking, caffeine, and the like that may affect sympathetic nerves and parasympathetic nerves.

2. Experiment Environment and Method

Figure 1:
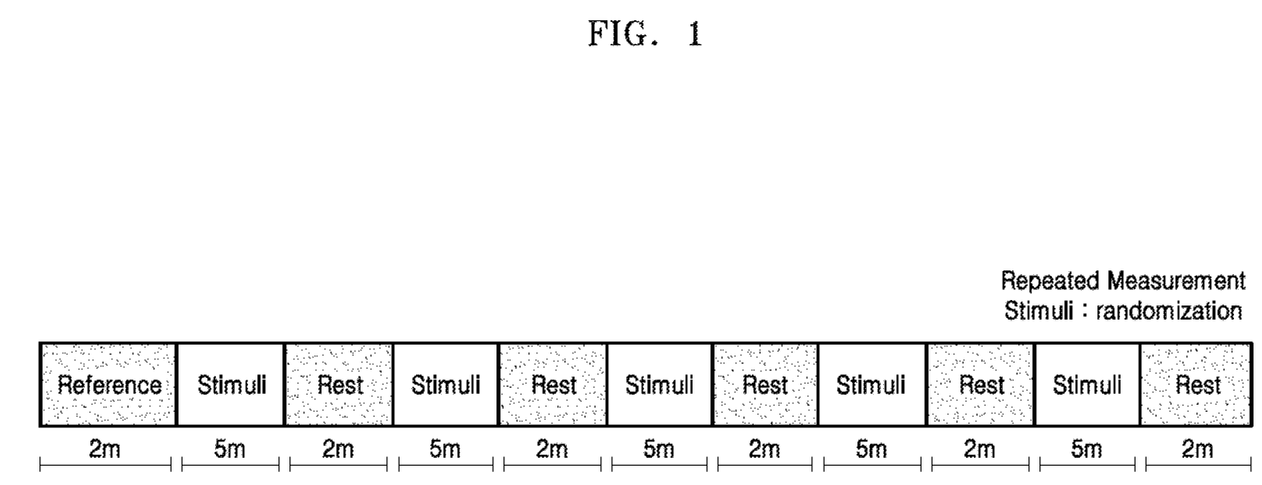
FIG. 1 illustrates an experiment procedure of presence expression according to the presently disclosed embodiment.

A space in which a certain level of illumination is maintained to minimize a change in a pupil size due to noise and light stimulation existing in an ambient environment was constructed, and the experiment was conducted in the space. To set a medium value (5 mm) of a pupil size as a reference value to normalize the pupillary response, an average illumination was maintained as 125 Lux (a maximum size of −8 mm and a minimum size of −2 mm of a general pupil). The room temperature was maintained at 23 to 25° C. on the average, and all of the participants were requested to have an adaptation time of 15 minutes at a sitting posture in order to minimize a measurement error due to a dark-adaptation phenomenon. Thereafter, the participants were made face the front of a black wall 70-80 cm away from each of the participants. The participants were made stare forward to prevent movement of the eyes and minimize an error of a camera and a pupil axis. At this time, the participants were requested to stare comfortably, because, when the eyes focus on one place, eyeballs change due to refraction of eye lenses. An experiment stimulus includes auditory stimuli to minimize a change in a pupil size due to an external light stimulus and a visual fatigue. 100 auditory stimuli were first collected for each of positive, negative, arousal, and relaxation. Based on the collected 400 auditory stimuli, auditory stimuli of high frequency were selected via a focus group discussion (FGD). The selected auditory stimuli were classified into positive, negative, arousal, relaxation, and neutrality and randomly proposed so that each participant cannot predict, and thus an order effect was removed. A detailed experiment procedure is shown in FIG. 1.

3. Analysis Method

ECG was measured via standard limb leads, lead I. A signal was amplified via an ECG 100C amplifier (Biopac systems Inc., USA), and signals were collected at a speed of 500 Hz via NI-DAQ-Pad9205 (National instruments Inc., USA). The collected signals were processed by using Labview 2010 software (National Instrument Inc., USA). The measured ECG signal was processed to detect an R-peak of an ECG signal by using a QRS detection algorithm (Pan, Jiapu and Tompkins, Willis J. (1985). A Real-Time QRS Detection Algorithm, IEEE Transactions on Biomedical Engineering). Processing of the detected R-peak calculated RRIs by using a difference between the detected R peak and an R-peak adjacent thereto. In the case of pupil detection, a Point Grey-GigE Camera (Point Grey Research, CANADA) was installed at a distance of about 90 cm from a participant, and an image of a face front having 13 frames (resolution of 900*600) per second was obtained. To minimize a reduction of the visibility of a boundary between a pupil and an iris according to a melanic pigment of an iris muscle that takes charge of dilating or contracting a pupil, a pupil image was obtained using an infrared camera. The obtained infrared pupil image information was processed to extract data by implementing a pupil information collecting algorithm by using a C++ language and an OpenCV library of Visual Studio2010 (Microsoft, USA). The center of a pupil was searched from the obtained image by performing circular edge detection, local binarization, component labeling, and region filling.

The circular edge detection determines an initial pupil region via circular template matching (Cho, Chul Woo; Lee, Ji Woo; Lee, Eui Chul; Park, Kang Ryoung (2009) Robust Gaze-Tracking Method By Using Frontal-Viewing and Eye-Tracking Cameras, Optical Engineering). Because a detected pupil may be represented as an oval instead of a circle according to an eye location and a camera photographing angle, the location determined by the circular template matching is not considered accurate. Thus, local binarization is performed on the basis of the determined location. Because rectangular areas are classified into two types, namely, a pupil region (foreground) and a non-pupil region (background), a threshold value of binarization may use a method proposed by Gonzalez (Gonzalez, Rafael C. and Woods, Richard E. (2002) Digital Image Processing, $2^{nd}$ Edition, Prentice-Hall, N.J.) and a binarization method (Doyle, Worthie (1962). Operations Useful for Similarity-Invariant Pattern Recognition, Journal of the ACM, New York) based on a histogram analysis proposed by Doyle.

After local binarization, a noise region due to eyebrows or a shadow may exist. When reflected light exists within a pupil region, the pupil region may be represented as having a hole therein. To address this problem, by performing component labeling with respect to a binarized region, identities are given to adjacent regions, and then a widest region remains and a region having a different identify from the widest region is removed, and thus the noise region is removed. Finally, a morphological closing operation is performed to fill the region having a hole, and then a center of gravity of the filled region is obtained and determined as a final pupil center.

Blinking was determined via a change in the number of relatively dark pixels within a certain size of rectangular region (100 pixels*100 pixels) by using the adaptive binarization method proposed by Gonzalez. At this time, blinking was processed such that, when a participant closes his or her eyes, a pupil region having relatively low brightness is not extracted by an eyelid skin region having high brightness. Accordingly, when the number of dark pixels as a result of binarization significantly decreases, it was determined that the eyes were closed. When it was determined that a participant closed his or her eyes and then opened the eyes, it was defined that the eyes blinked once.

4. Result of Experiment

In the experiment according to the presently disclosed embodiment, because a pupil is an index of reflecting the activity of an autonomic nervous system, a model that infers a pupil response via an RRI parameter of an ECG response was developed using a simple linear regression analysis. An optimal straight line was obtained in the form of an equation, such as y=Bx+A, via a least square technique of searching for a straight line having a least error from the values of actually-distributed dependent variables in a distribution of independent variables (RRI) and dependent variables (pupillary response), wherein an inclination B indicates a regression coefficient and A indicates a constant. A square of R (a determination coefficient; $R^2$) means a ratio of a variation described by a regression model to the entire variation of dependent variables. As an analysis result, R was confirmed to be 0.552, $R^2$ was confirmed to be 0.304, and it was confirmed from a result of a statistical significance verification of a regression model that a regression model obtained as p=0.000 was significant. The regression coefficient was calculated using Equation 1 below, and a resultant value of −42.494 was derived.

$$B = \frac{\sum (X - \overline{X})(Y - \overline{Y})}{\sum (X - \overline{X})^2}$$ [Equation 1]

Figure 2A:
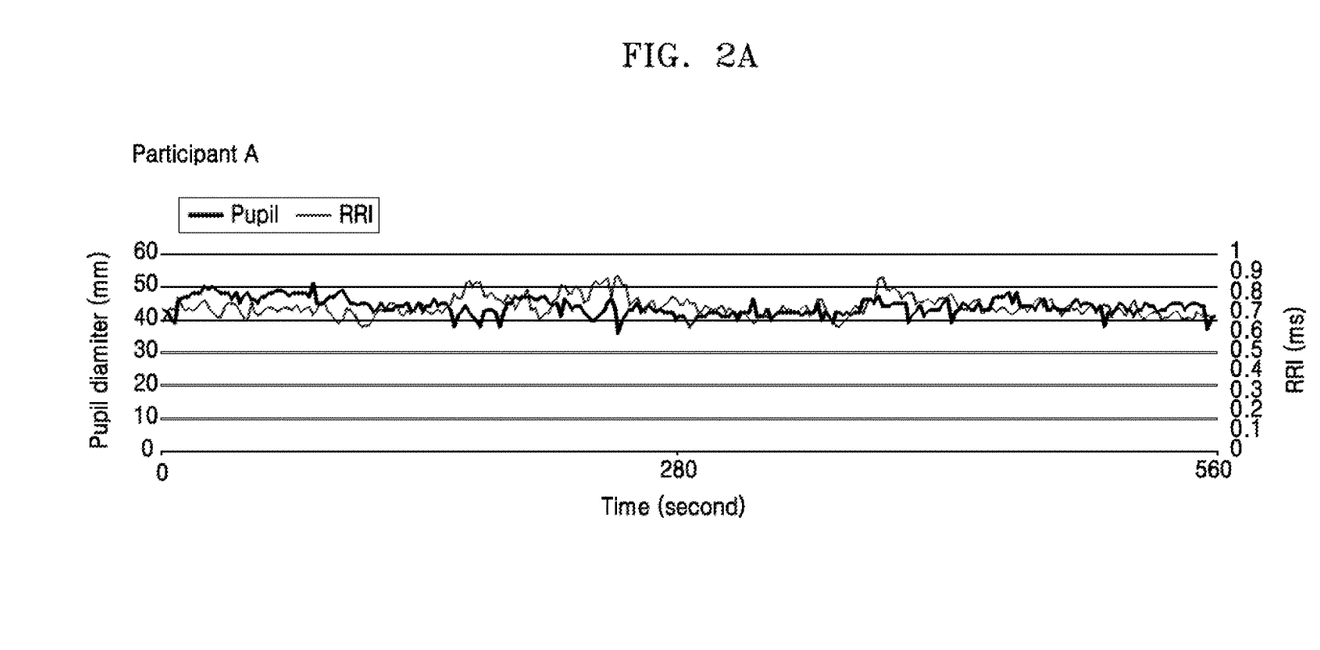
FIGS. 2A-2C show results of analyses of an R-peak to R-peak interval (RRI) and a change in a pupil size.
Figure 2B:
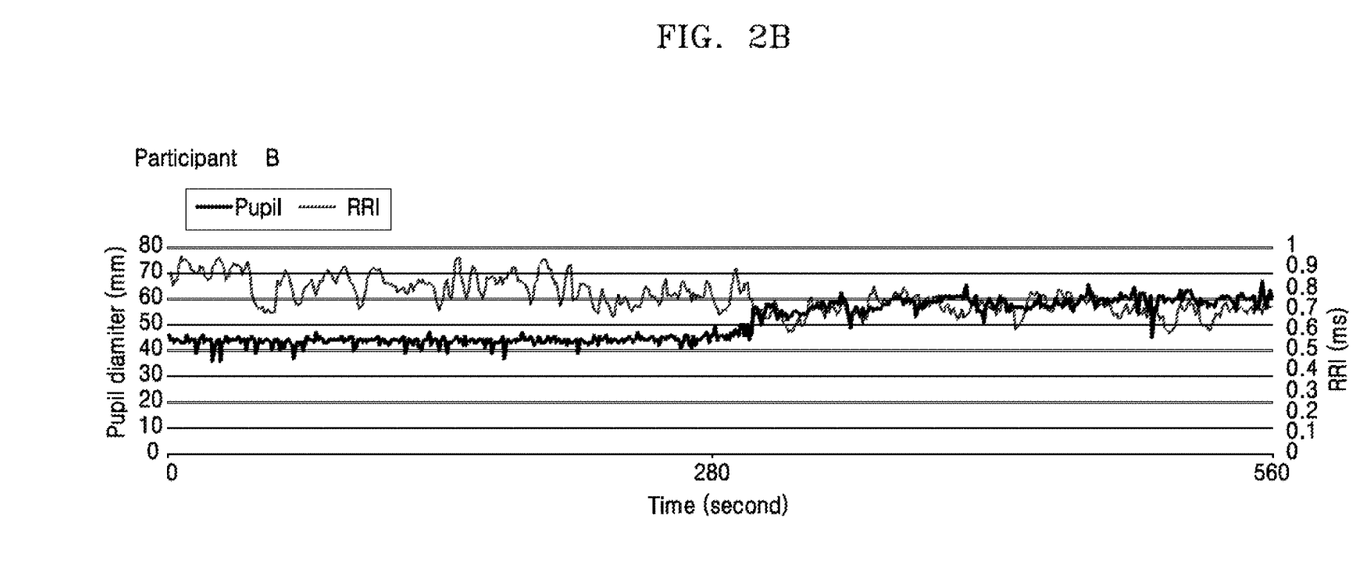
Figure 2C:
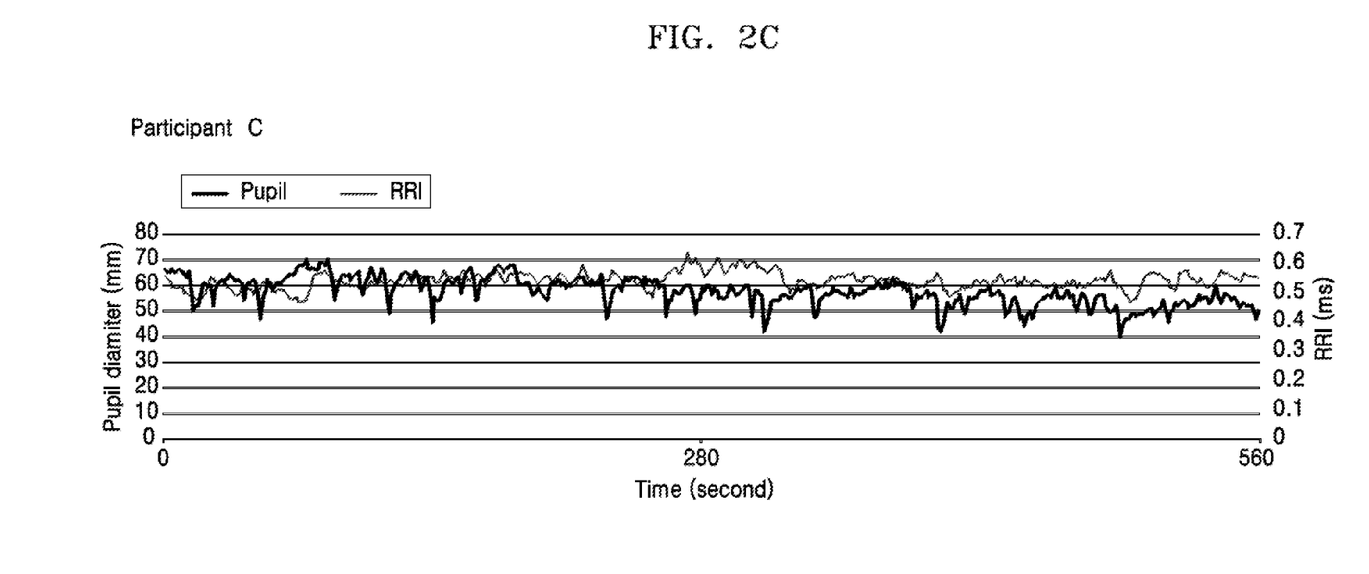

$B$ = Regression coeffieient $X$ = X value $Y$ = Y value $\overline{X}$ = X value mean $\overline{Y}$ = Y value mean A pupillary response inferring model expression using an ECG response estimated by the result is Equation 2 below, and detailed patterns are the same as shown in FIGS. 2a, 2b, ad 2c.

Pupil size=76.148+(−42.494)×RRI [Equation 2]

To verify the inferring model developed via the simple linear regression analysis, 12 participants were verified based on the derived regression model. As a result of the verification, it was confirmed that an actually-measured pupil size was different from an expected pupil size by about 0.68 mm on the average. Representative results of the experiment, are shown in FIGS. 2A-2C.

FIGS. 2A-2C show results of analyses of changes in a RRI and a change in a pupil size according to the presently disclosed embodiment. That is, FIGS. 2A-2C show analysis results of different users or participants (participants A, B, and C).

Figure 3:
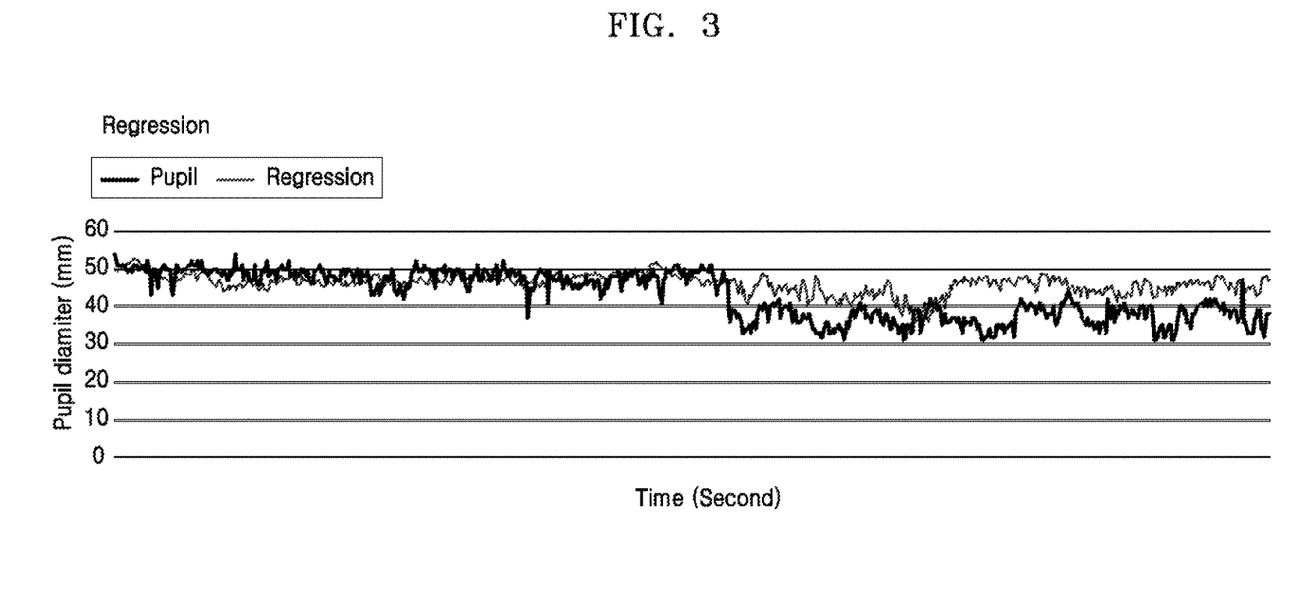
FIG. 3 shows a result of an analysis of a measured pupil size and an expected pupil size according to the presently disclosed embodiment.

FIG. 3 shows a result of an analysis of a measured pupil size and an expected pupil size according to the presently disclosed embodiment.

As in the experiment result, as a result of applying a change in a pupil size of an actual user according to heartbeats of the actual user to a virtual avatar and evaluating a presence of the virtual avatar, it was confirmed that the change in the pupil size was a presence expressing factor capable of increasing a visual presence, a visual immersion, and a visual interaction. There is proposed a method of expressing a digital presence of a realistic virtual avatar via a change in a pupil size according to heartbeats as an index of reflecting the activity of an autonomic nervous system in real time based on the research result.

The presently disclosed embodiment includes a process of inputting a 3D virtual avatar, a process of acquiring ECG data, a data analysis process of inferring a pupil size change from the acquired ECG data, and an expression process of applying an expressing factor corresponding to a pupil size according to heartbeats. This method enables a realistic avatar to be obtained by using a basically-modeled 3D virtual avatar. This method also enables a new virtual avatar to be generated by applying a change in a pupil size of a user according to heartbeats of the user in real time.

Figure 4:
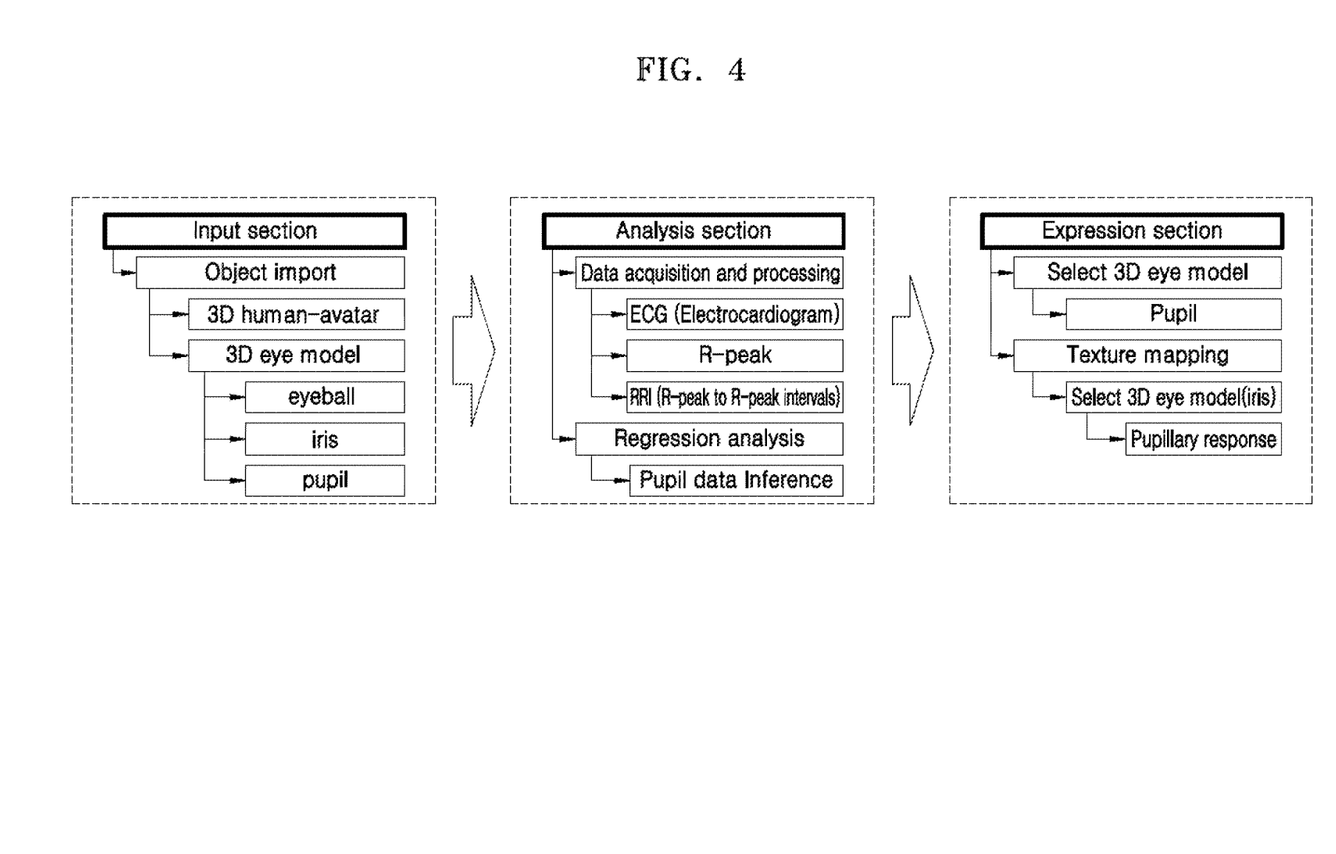
FIG. 4 illustrates an experiment procedure according to the presently disclosed embodiment.

Referring to FIG. 4, an aspect of the presently disclosed embodiment may be performed as follows.

[Step 1] object import: this operation is an inputting operation, and imports a basically-modeled 3D virtual avatar. The virtual avatar has a specific eyeball, a specific pupil, and a specific iris.

[Step 2] data acquisition: this operation is to acquire data from a user. At this time, a signal is amplified via an ECG 100C amplifier (Biopac systems Inc., USA) connected to measure ECG data of an actual user in real time, and the signal is acquired at a speed of 500 Hz by using NI-DAQ-Pad9205 (National instruments Inc., USA).

[Step 3] regression analysis: this operation is to infer a change in a pupil size via a regression analysis. To this end, the signal acquired in the previous operation detects an R-peak via a QRS detection algorithm as described above. The detected R-peak calculates RRIs by using a difference between the detected R peak and an R-peak adjacent to the detected R peak. The change in the pupil size is inferred using the regression model based on the extracted RRI.

[Step 4] texture mapping: a pupil portion is selected from the eye model imported in the first operation, and the change in the pupil size of the user according to heartbeats of the user inferred in the third operation is applied in real time.

Preferred aspects have been explained above and shown in the attached drawings in order to promote understanding of the presently disclosed embodiment. It should be however understood that these aspects described therein should be considered in a descriptive sense only and not for purposes of limitation. Descriptions of features or aspects within each disclosed embodiment should typically be considered as available for other similar features or aspects in other disclosed embodiments, because various changes in form and details may be made by one of ordinary skill in the art.

What is claimed is:

1. A method of expressing a social engagement of a virtual avatar, the method comprising synchronizing a change in a size of a pupil of a virtual avatar correlated with a user according to a change in heartbeats that is detected from electrocardiogram (ECG) data obtained from the user, wherein R-peak to R-peak intervals (RRIs) are detected from the ECG data, a change in a pupil size of the user is detected from the RRIs, and the pupil size of the user is calculated using an equation below:

$$\text{Pupil size}=76.148+(-42.494)\times \text{RRI}.$$

2. The method of claim 1, wherein the change in the pupil size of the user is inferred from the ECG data via a regression analysis, and the size of the pupil of the virtual avatar is synchronized with the extracted change in the pupil size of the user.

3. A system for expressing a social engagement of a virtual avatar, the system comprising:
a detecting system configured to detect electrocardiogram (ECG) data from a user;
an analysis system configured to detect a change in a pupil size of the user from the ECG data; and
a display system configured to display a virtual avatar correlated with the user and having an eye model that changes in correspondence with the change in the pupil size of the user detected by the analysis system,
wherein a change in a size of a pupil of the virtual avatar correlated with the user is synchronized according to a change in heartbeats obtained from the ECG data, R peak to R-peak intervals (RRIs) are detected from the ECG data, the change in the pupil size of the user is detected from the RRIs and the pupil size of the user is calculated using an equation below:

$$\text{Pupil size}=76.148+(-42.494)\times \text{RRI}.$$

4. The system of claim 3, wherein the change in the pupil size of the user is inferred from the ECG data via a regression analysis, and the size of the pupil of the virtual avatar is synchronized with the extracted change in the pupil size of the user.

* * * * *